United States Patent
Gonzalez et al.

(10) Patent No.: US 9,098,530 B2
(45) Date of Patent: *Aug. 4, 2015

(54) SCALABLE RENDERING OF LARGE SPATIAL DATABASES

(71) Applicant: Google Inc., Mountain View, CA (US)

(72) Inventors: Hector Gonzalez, Sunnyvale, CA (US); Jayant Madhavan, San Francisco, CA (US); Andrin Von Rechenberg, Zurich (CH); Anno Langen, Berkeley, CA (US); Alon Halevy, Los Altos, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/079,764

(22) Filed: Nov. 14, 2013

(65) Prior Publication Data
US 2014/0074854 A1   Mar. 13, 2014

Related U.S. Application Data

(63) Continuation of application No. 13/547,409, filed on Jul. 12, 2012, now Pat. No. 8,589,425, which is a continuation of application No. 12/796,142, filed on Jun. 8, 2010, now Pat. No. 8,244,743.

(51) Int. Cl.
*G06F 7/00* (2006.01)
*G06F 17/30* (2006.01)

(52) U.S. Cl.
CPC .... *G06F 17/30241* (2013.01); *G06F 17/30091* (2013.01); *G06F 17/30312* (2013.01); *G06F 17/30554* (2013.01); *G06F 17/30991* (2013.01); *G06F 17/30994* (2013.01)

(58) Field of Classification Search
None
See application file for complete search history.

(56) References Cited

U.S. PATENT DOCUMENTS

| | | | |
|---|---|---|---|
| 2004/0024770 | A1 | 2/2004 | Cardno |
| 2004/0054665 | A1 | 3/2004 | Yoo et al. |
| 2009/0063524 | A1 | 3/2009 | Adler et al. |
| 2010/0114905 | A1 | 5/2010 | Slavik et al. |
| 2010/0185984 | A1* | 7/2010 | Wright et al. ................. 715/833 |

OTHER PUBLICATIONS

Stolte, "Polaris: a system for query, analysis, and visualization of multidimensional relational databases", IEEE Transactions on Visualization and Computer Graphics, vol. 8, Issue 1, pp. 52-65, 2002, IEEE.*

(Continued)

*Primary Examiner* — Michael Hicks
(74) *Attorney, Agent, or Firm* — Lerner, David, Littenberg, Krumholz & Mentlik, LLP

(57) ABSTRACT

Aspects of the invention provide a service for data management and integration across a wide range of applications. Clustered computers may be arranged in a cloud-type configuration for storing and handling large amounts of user data under the control of a front-end management server. Communities of distributed users may collaborate on the data across multiple enterprises. Very large tabular data files are uploaded to the storage facilities. The data files are maintained as tables, and a composite table of related information is created and maintained in response to user queries. Different ways of visualizing the data are provided. Depending on the amount of information that can be displayed, features in a spatial index may the thinned for presentation. Spatial and structured queries are processing and results are intersected to obtain information for display.

18 Claims, 7 Drawing Sheets

(56) References Cited

OTHER PUBLICATIONS

Guo, "A Geographic Visual Query Composer (GVQC) for accessing federal databases", Proceedings of the 2003 annual national conference on Digital government research, ACM, 2003.*

Zimmerman, "Spatial data query support in peer-to-peer systems", Proceedings of the 28th Annual International Computer Software and Applications Conference, vol. 2, pp. 82-85, 2004, IEEE.*

Gonzalez et al., "Google fusion tables: data management, integration and collaboration in the cloud", Proceedings of the 1st ACM symposium on Cloud computing, pp. 175-180, Jun. 10, 2010, ACM.*

Gonzalez et al., "Google Fusion Tables: Web-Centered Data Management and Collaboration," SIGMOD, Jun. 2010, pp. 1061-1066.

Corbett, James, "Testing Large-Scale Distributed Storage Systems," Google Power Point Presentation, Jun. 28, 2009, 21 slides.

Chang et al., "Bigtable: A Distributed Storage System for Structured Data," OSDI 2006 Paper, pp. 205-218 of the Proceedings.

Sadikov et al., "Clustering Query Refinements by User Intent," World Wide Web Conference Committee, Apr. 2010, 10 pages.

Jagadish et al., "Making Database Systems Usable," SIGMOD, Jun. 2007, pp. 13-24.

Madhavan et al., "Web-Scale Data Integration: You Can Only Afford to Pay as You Go," CIDR 2007, pp. 342-350.

International Search Report and Written Opinion, PCT/US2011/039252, dated Dec. 22, 2011.

Stolte, "Polaris: a system for query, analysis, and visualization of multidimensional relational databases", IEEE Transactions on Visualization and Computer Graphics, vol. 8, Issue 1, pp. 52-65,2002, IEEE.

Zimmerman, "Spatial Data Query Support in Peer-to-Peer Systems," Proceedings of the 28th Annual International Computer Software and Applications Conference, vol. 2, pp. 82-85, 2004, IEEE.

"Hilbert R-tree", wikipedia, Apr. 6, 2010, XP002720218, Retrieved from the Internet: URL: http://en.wikipedia.org/w/index.php?title=Hilbert_R-tree&oldid=354258341.

Chang F et al: "BigTable: A Distributed Storage System for Structured Data", 7th Symposium on Operating Systems Design and Implementation, Nov. 6-8, 2006, Seattle, WA, USENIX Association, US, Jan. 1, 2006, pp. 205-218, XP001544719.

Extended European Search Report for Application No. 11792949.7 dated Mar. 3, 2014.

Poulraj Ponniah Ed—Ponniah P: "Data Warehousing Fundamentals: A Comprehensive Guide for IT Professionals, Chapter 12 Data Extraction, Transformation, and Loading, Chapter 16 Data Warehousing and the Web", Jan. 1, 2001, Data Warehousing Fundamentals: A Comprehensive Guide for IT Professionals, New York, John Wiley & Sons, US, pp. 1-2,VII, XP002439035.

* cited by examiner

100

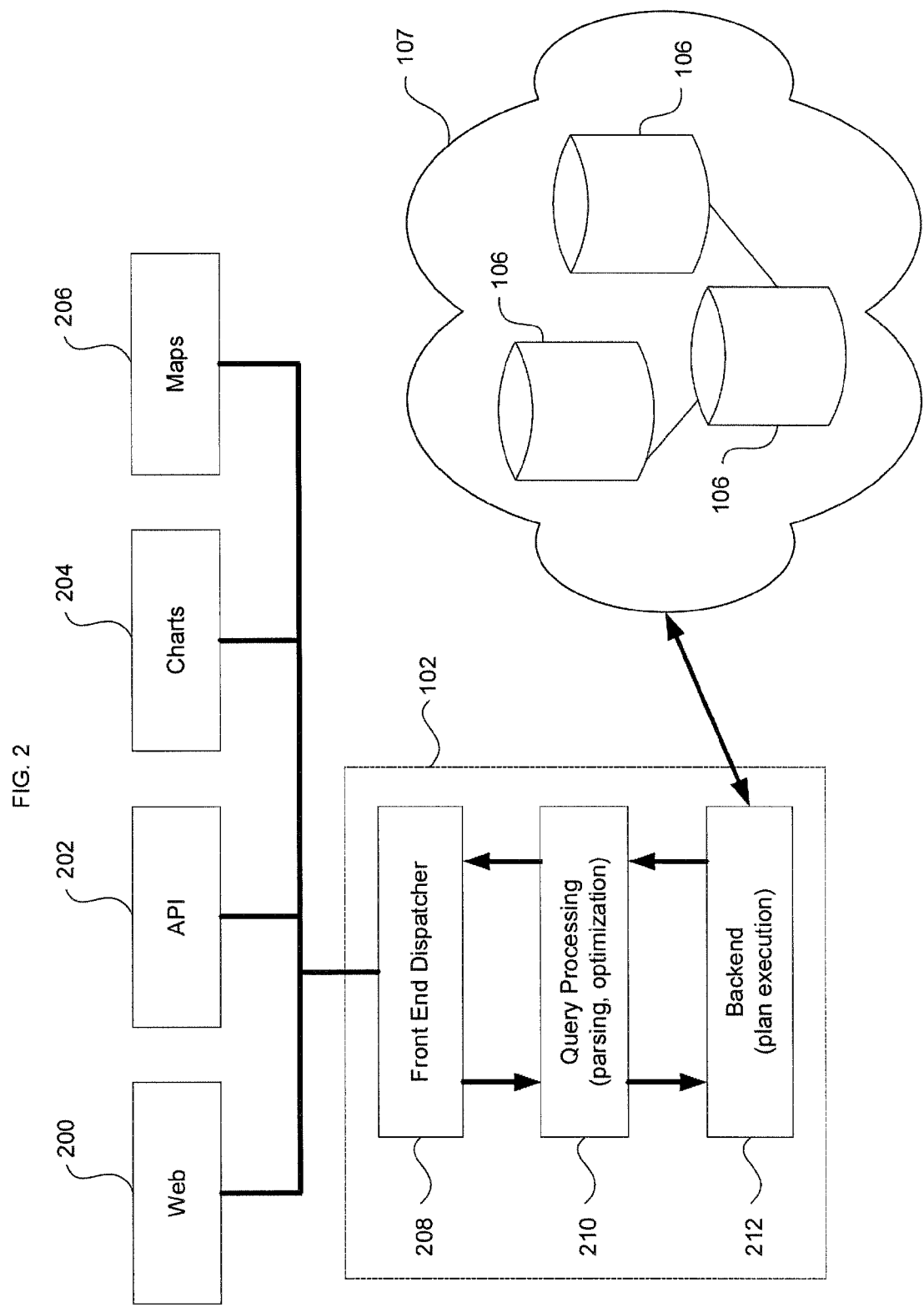

FIG. 3B

File View Edit Visualize Merge

Current view: All - Show options (filter/aggregate/choose columns)

1 - 100 of 6803

| rating | name | trip_link | descent | ascent | min_elevation | id | |
|---|---|---|---|---|---|---|---|
| 4 | Montana de Oro | http://www.mtbguru.com/trip/show_static/1 | -566.63 | 566.325 | 22.8603 | 1 | @ |
| 5 | Fort Ord | http://www.mtbguru.com/trip/show_static/4 | -893.684 | 913.192 | 43.2821 | 4 | @ |
| 5 | Glacier Gorge | http://www.mtbguru.com/trip/show_static/6 | -904.657 | 948.854 | 2788.95 | 6 | @ |
| 4 | Mount Elbert | http://www.mtbguru.com/trip/show_static/7 | -1610.28 | 1643.5 | 3063.28 | 7 | @ |
| 5 | Kaibab Trail to Bright Angel | http://www.mtbguru.com/trip/show_static/8 | -1555.41 | 1438.98 | 749.512 | 8 | @ |
| 5 | Hidden Canyon | http://www.mtbguru.com/trip/show_static/9 | -441.356 | 450.805 | 1410.02 | 9 | @ |
| 5 | Slickrock Trail | http://www.mtbguru.com/trip/show_static/10 | -789.137 | 792.185 | 1352.72 | 10 | @ |
| 3 | Santa Teresa spring ride | http://www.mtbguru.com/trip/show_static/11 | -430.688 | 428.249 | 106.376 | 11 | @ |
| 4 | Tamaracho Trail | http://www.mtbguru.com/trip/show_static/12 | -665.691 | 677.274 | 25.6035 | 12 | @ |
| 4 | Bootleg Canyon | http://www.mtbguru.com/trip/show_static/13 | -582.48 | 584.614 | 833.029 | 13 | @ |
| 5 | South Mountain Pheonix | http://www.mtbguru.com/trip/show_static/14 | -799.195 | 794.928 | 406.303 | 14 | @ |
| 4 | Yosemite Valley to Glacier Point | http://www.mtbguru.com/trip/show_static/15 | -1143.01 | 1228.97 | 1143.01 | 15 | @ |
| 4 | Annadel State Park | http://www.mtbguru.com/trip/show_static/16 | -593.758 | 600.463 | 87.1739 | 16 | @ |

SCALABLE RENDERING OF LARGE SPATIAL DATABASES

CROSS REFERENCE TO RELATED APPLICATIONS

This application is a continuation of U.S. application Ser. No. 13/547,409, filed on Jul. 12, 2012 and issued as U.S. Pat. No. 8,589,425 on Nov. 19, 2013, which is a continuation of U.S. application Ser. No. 12/796,142, filed on Jun. 8, 2010 and issued as U.S. Pat. No. 8,244,743 on Aug. 14, 2012, the entire disclosures of which are incorporated herein by reference.

BACKGROUND OF THE INVENTION

1. Field of the Invention

The present invention relates generally to collaborative applications, including handling of spatial and structured queries in large-scale databases.

2. Description of Related Art

Collaborative tools allow users to work together one different applications and to share data. In many instances users may work together concurrently or share data remotely. This may help productivity and speed up application development and service deployment. However, large quantities of data may not be easy to share or manage among multiple users. This can diminish or restrict the collaborative experience.

SUMMARY OF THE INVENTION

Aspects of the invention permit users to upload or export data tables in different formats, including spreadsheets, CSV files and KML files. The data may be associated with geographical information, and may include a large amount of data. As explained herein, systems and methods according to aspects of the invention allow large data sets, e.g., 100 MB, 250 MB or more, to be uploaded to a cloud-type architecture. Once uploaded, other collaborators may view, edit or add to the data. This information may be viewed on a map or chart immediately, thereby enhancing the collaborative process.

In accordance with one embodiment, a method of handling user queries and performing data management is provided. The method comprises receiving data sets from a plurality of user devices; storing each data set as a table associated with a respective user; generating a composite table from a group of the tables associated with the respective users, the composite table including all rows from each table of the group and each entry of the composite table representing a row of a given one of the group of tables; receiving a plurality of user queries from one or more of the user devices; and responding to one or more of the plurality of user queries by generating a visualization of selected data in the composite table for display on one or more of the user devices, the visualization being determined based on data types found in the composite table and any required data types needed for each visualization; wherein one of the composite table data types includes location information, and the visualization comprises a map for displaying at least a portion of the location information.

In one example the composite table is formed by merging the group of tables together as a view. In another example, authorized users are allowed to comment on rows, columns or cells of all tables in the composite table. Here, all comments on data in the composite table may be stored in a single table having a key identifies an element being commented on by table, row and column. In this case, a value of the row desirably represents at least one of text of the comment, author and date of comment posting.

In another example, responding to a given one of the user queries includes mapping the given query into a key lookup, a prefix scan and a range scan. In a further example, the method further comprises rendering the composite table as one or more map layers. Here, responding to the one or more user queries may include sending a collection of tiles containing the map layers to selected ones of the user devices associated with the user queries.

In accordance with another embodiment of the invention, a method of handling user queries and performing data management is provided. The method comprises receiving data sets from a plurality of user devices; storing each data set as a table associated with a respective user; generating a composite table from a group of the tables associated with the respective users, the composite table including all rows from each table of the group and each entry of the composite table representing a row of a given one of the group of tables; receiving a plurality of user queries from one or more of the user devices; responding to one or more of the plurality of user queries by generating a visualization of selected data in the composite table for display on one or more of the user devices, the visualization being determined based on data types found in the composite table and any required data types needed for each visualization; and inserting geographical features of each data set into a spatial index.

In one example, the spatial index is configured for dynamic modification by collaborative users so that features can be added, deleted, or updated to the spatial index. In one alternative, the spatial index may use a space filling curve to map points on the Earth's surface to a one dimensional curve. In another alternative, the method further comprises thinning the spatial index to reduce a number of features viewable in a given map tile to a set of features that is no greater than a predetermined feature amount. Here, the visualization desirably includes the set of features of the thinned spatial index, and wherein the set of features is consistent among responses to different user queries.

In a further embodiment, a data processing method comprises generating a composite table from a group of tables associated with respective users, the composite table including all rows from each table of the group and each entry of the composite table representing a row of a given one of the group of tables; receiving a plurality of user queries from one or more user devices; and responding to at least one of the user queries by executing a spatial query to obtain a spatial query result; executing a structured query to obtain a structured query result; intersecting the spatial and structured query results; and sending the intersected results to at least one of the user devices for display.

According to yet another embodiment, a system for handling user queries and performing data management is provided. The system comprises means for storing data associated with user queries and a processor device logically coupled to the storage means. The processor device is operable to receive data sets from a plurality of user devices; store each data set as a table associated with a respective user; generate a composite table from a group of the tables associated with the respective users, the composite table including all rows from each table of the group and each entry of the composite table representing a row of a given one of the group of tables; receive a plurality of user queries from one or more of the user devices; respond to one or more of the plurality of user queries by generating a visualization of selected data in the composite table for display on one or more of the user devices, the visualization being determined based on data types found in the composite table and any required data types needed for each visualization; and insert geographical features of each data set into a spatial index.

In one example, the processor device includes a dispatcher module for converting the user queries into a common representation, a query processing module for creating a query plan, and a backend module for communicating with a set of remote computers for storing and managing the data sets and the composite table. In another example, the spatial index is configured for dynamic modification by collaborative users so that features can be added, deleted, or updated to the spatial index. In an alternative, the spatial index uses a space filling curve to map points on the Earth's surface to a one dimensional curve. In another alternative, the processor is further operable to thin the spatial index to reduce a number of features viewable in a given map tile to a set of features that is no greater than a predetermined feature amount. In this case, the visualization may include the set of features of the thinned spatial index. Here, the set of features is consistent among responses to different user queries.

And in another embodiment, a data management system comprises means for storing data associated with user queries and a processor device logically coupled to the storage means. The processor device is operable to generate a composite table from a group of tables associated with respective users, the composite table including all rows from each table of the group and each entry of the composite table representing a row of a given one of the group of tables; receive a plurality of user queries from one or more user devices; and respond to at least one of the user queries by executing a spatial query to obtain a spatial query result, executing a structured query to obtain a structured query result, intersecting the spatial and structured query results, and sending the intersected results to at least one of the user devices for display.

According to one aspect, a method of handling user queries and performing data management is provided. The method comprises obtaining data sets from a plurality of user devices, each data set having a permission, at least some of the data sets having different permissions; storing each data set as a table associated with a respective user; generating a composite table from a group of the tables associated with the respective users, the composite table including one or more rows from each table of the group and each entry of the composite table representing a row of a given one of the group of tables; and generating one or more visualizations of selected data in the composite table for display on one or more selected user devices, the one or more visualizations being determined based on data types found in the composite table, any required data types needed for each visualization, and the permissions associated with the data sets.

In one example, authorized users are allowed to comment on rows, columns or cells of one or more tables in the composite table based on the permissions associated with the data sets. In another example, access is granted to some or all of the selected data in the composite table using address information for authorized users. And in another example, the composite table is generated by merging the group of the tables associated with the respective users as a view.

According to another aspect, a method of handling user queries and performing data management is provided. The method comprises storing a plurality of data sets as a table, each data set being associated with a respective user; generating a composite table from a group of the tables associated with the respective users, the composite table including one or more rows from each table of the group and each entry of the composite table representing a row of a given one of the group of tables; generating a visualization of selected data in the composite table for display, the visualization being determined based on data types found in the composite table and any required data types needed for each visualization; and providing data usable to render the composite table as one or more map layers.

In one alternative, the method further comprises receiving a request to view a given one of the one or more map layers; and creating a tile in response to the request, the tile including one or more features responsive to the request. In this case the one or more features may be associated with a spatial index, where the spatial index is configured for dynamic modification by collaborative users so that selected features can be added, deleted, or updated to the spatial index. Here, at least some of the features associated with the spatial index may have permission information. The spatial index may be further configured so that the selected features can be added, deleted, or updated in accordance with the permission information.

In another alternative, authorized users are allowed to comment on rows, columns or cells of all tables in the composite table in accordance with permission information.

In a further aspect, a method of handling user queries and performing data management is provided. The method comprises storing a plurality of data sets as a table, each data set being associated with a respective user; generating a composite table from a group of the tables associated with the respective users, the composite table including one or more rows from each table of the group and each entry of the composite table representing a row of a given one of the group of tables; and generating a visualization of selected data in the composite table for display, the visualization being determined based on data types found in the composite table and any required data types needed for each visualization.

In one example, the composite table is formed by merging the group of tables together as a view. In another example, authorized users are allowed to comment on rows, columns or cells of all tables in the composite table in accordance with permission information. In this case, all comments on data in the composite table may be stored in a single table having a key identifying an element being commented on by table, row and column. And in another example, the composite table is rendered as one or more map layers.

A further aspect includes a data processing method, comprising: generating a composite table from a group of tables associated with respective users, the composite table including one or more rows from each table of the group and each entry of the composite table representing a row of a given one of the group of tables; executing a spatial query to obtain a spatial query result; executing a structured query to obtain a structured query result; intersecting the spatial and structured query results; and generating a query response including the intersected results.

In one example, the spatial and structured queries are executed in parallel. In another example, a received query contains a collection of predicates and an aggregation specification. In this case, the query response may include a set of feature IDs satisfying the collection of predicates.

In yet another example, the spatial query is associated with a bounding box having a pair of boundary coordinates. In this case, executing the spatial query may include converting one or more ranges in a space filling curve and, for each range, retrieving all features that are contained in cells between a start and an end of the range.

BRIEF DESCRIPTION OF THE DRAWINGS

FIG. 2 illustrates an exemplary architecture in accordance with aspects of the invention.

FIGS. 3A-C illustrate maps and user interface configurations in accordance with aspects of the invention.

The aspects, features and advantages of the invention will be appreciated when considered with reference to the following description of embodiments and accompanying figures. The following description does not limit the present invention; rather, the scope of the invention is defined by the appended claims and equivalents.

DETAILED DESCRIPTION

Aspects of the invention provide a cloud-based service for data management and integration across a wide range of applications. Communities of users are thus able to collaborate on data management across multiple enterprises. As will be discussed in more detail below, users are able to upload very large tabular data files (e.g., spreadsheets or CSV files) of up to 100 MB or more. Different ways of visualizing the data (e.g., charts, maps, timelines) are enabled.

Users are provided the ability to query by filtering and aggregating the data. Integration of data from multiple sources is supported by performing joins across tables that may belong to different users. Users may keep the data private, share it with a select set of collaborators, or make it public. When data is made public, it is "crawlable" by search engines.

A discussion feature allows collaborators to conduct detailed discussions of the data at the level of individual rows, columns or cells. Aspects of the invention provide a tool that makes data management easier and therefore approachable to a larger audience of users. Users may not necessarily have any training in using database systems, and typically do not have access to expert database administrators (DBAs).

Other aspects include mechanisms to provide incentives for data sharing among users or groups of users. Furthermore, when data is shared among collaborators, querying may be only one part of the activity. Thus, aspects also support the process of agreeing on the meaning of data, and discussion on possible errors it may contain.

Figure 1A:
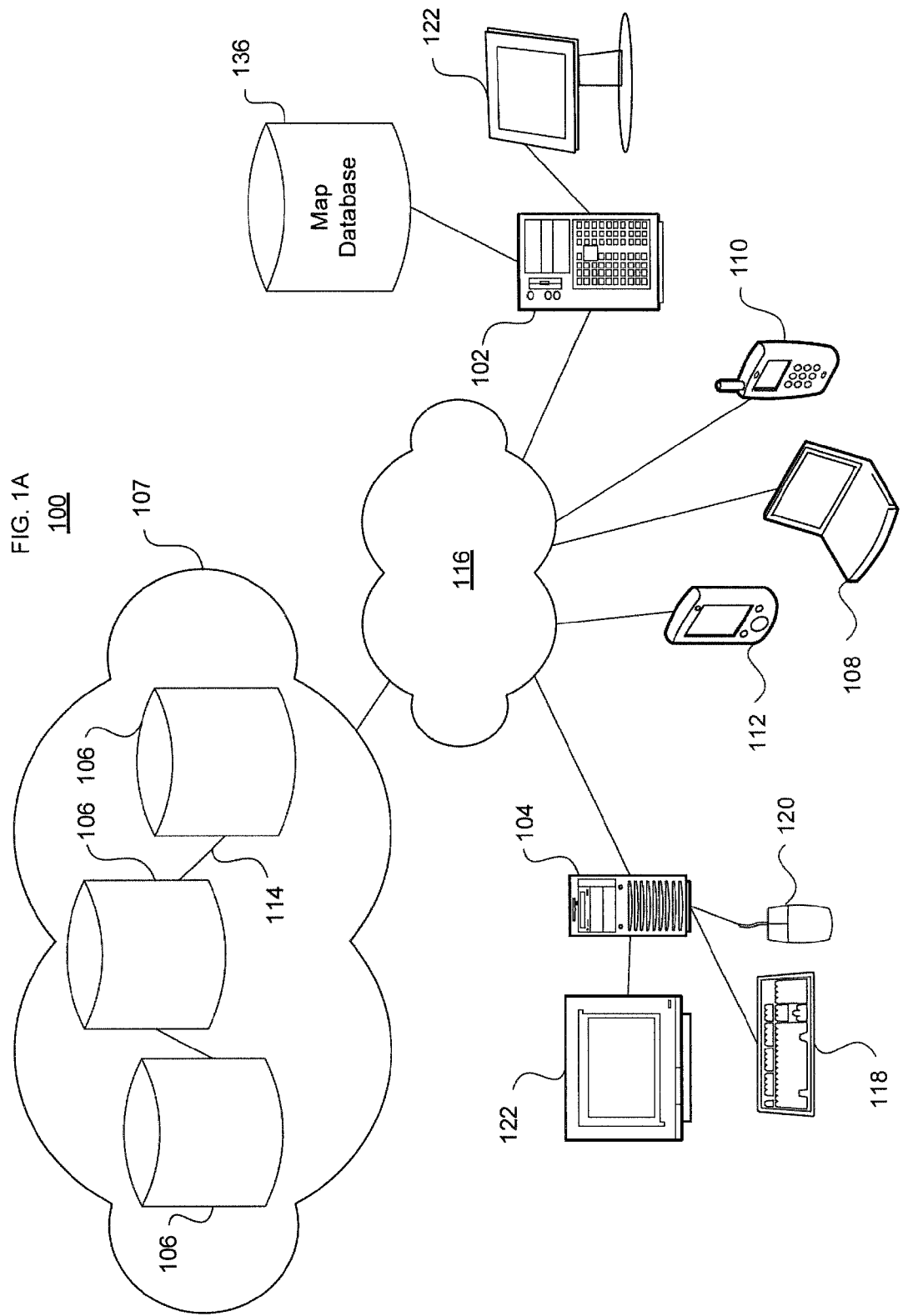
FIGS. 1A-B illustrates a system for use in accordance with aspects of the invention.
Figure 1B:
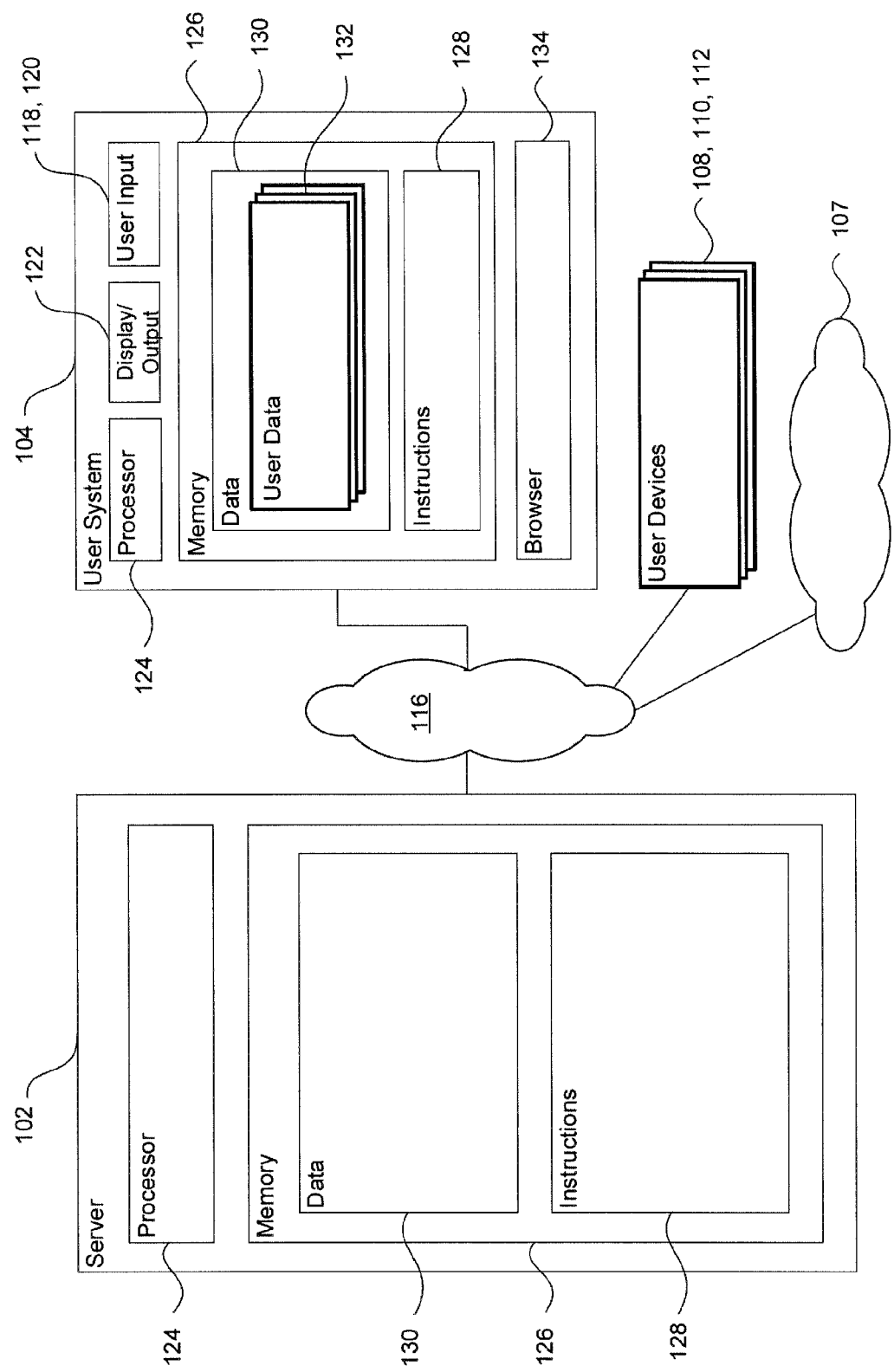

FIGS. 1A-B present schematic diagrams of an exemplary computer system depicting various computing devices that can be used alone or in a networked configuration in accordance with aspects of the present invention. For example, FIG. 1A illustrates a computer network 100 having a plurality of computers 102, 104, 106 and 108 as well as other types of devices such as portable electronic devices such as a mobile phone 110 and a PDA 112. Such devices may be interconnected via a local or direct connection 114 and/or may be coupled via a communications network 116 such as a LAN, WAN, the Internet, etc., and which may be wired or wireless.

Each device may include, for example, one or more processing devices and have user inputs such as a keyboard 118 and mouse 120 and/or various other types of input devices such as pen or stylus inputs, joysticks, buttons, trackballs, touch screens, etc., as well as a display 122, which could include, for instance, a CRT, LCD, plasma screen monitor, TV, projector, etc. Each computer 102, 104, 106 and 108 may be a personal computer, server, etc. By way of example only, computer 102 may a server (e.g., a web server), computer 104 may be a desktop personal computer, computers 106 may be a cluster 107 of application servers in a cloud computing environment, and computer 108 may be a laptop, palmtop or tablet computer.

As shown in FIG. 1B, each computer such as computers 102 and 104 contains a processor 124, memory/storage 126 and other components typically present in a computer. For instance, memory/storage 126 stores information accessible by processor 124, including instructions 128 that may be executed by the processor 124 and data 130 that may be retrieved, manipulated or stored by the processor. The memory/storage may be of any type or any device capable of storing information accessible by the processor, such as a hard-drive, ROM, RAM, CD-ROM, DVD-ROM, flash memories, etc. The processor 124 may comprise any number of well-known processors, such as processors from Intel Corporation or Advanced Micro Devices. Alternatively, the processor may be a dedicated controller for executing operations, such as an ASIC.

The instructions 128 may comprise any set of instructions to be executed directly (such as machine code) or indirectly (such as scripts) by the processor(s). In that regard, the terms "instructions," "steps" and "programs" may be used interchangeably herein. The instructions may be stored in any computer language or format, such as in object code or modules of source code. The functions, methods and routines of instructions in accordance with the present invention are explained in more detail below.

Data 130 may be retrieved, stored or modified by processor 124 in accordance with the instructions 128. The data may be stored as a collection of data. For instance, although the invention is not limited by any particular data structure, the data may be stored in computer registers, in a relational database as a table having a plurality of different fields and records, XML documents, flat files, etc. Map-related image data may be stored in flat flies such as keyhole flat files ("KFFs").

The data may also be formatted in any computer readable format such as, but not limited to, binary values, ASCII or Unicode. Moreover, the data may include any information sufficient to identify the relevant information, such as descriptive text, proprietary codes, pointers, references to data stored in other memories (including other network locations) or information which is used by a function to calculate the relevant data.

Although the processor 124 and memory 126 are functionally illustrated in FIG. 1B as being within the same block, it will be understood that the processor and memory may actually comprise multiple processors and memories that may or may not be stored within the same physical housing or location. For example, some or all of the instructions and data may be stored on a removable recording medium such as a CD-ROM, DVD or Blue-Ray disc, or flash memory, while other instructions and data may be stored within a read-only computer chip. Some or all of the instructions and data may be stored in a location physically remote from, yet still accessible by, the processor. Similarly, the processor may actually comprise a collection of processors which may or may not operate in parallel. Data may be distributed and stored across multiple memories 126 such as hard drives or the like. For instance, the cluster 107 of computers 106 may comprise one or more server farms for handling very large amounts of data and user requests.

In one aspect, server 102 may communicate with one or more client computers 104 and other client devices such as computer 108, mobile phone 110 and PDA 112. Each client computer or other client device may be configured similarly to the computer 104, with a processor, memory and instructions, as well as one or more user input devices 118, 120 and a user output device, such as display 122. Each client device may be a general purpose computer, intended for use by a person, having all the components normally found in a personal computer such as a central processing unit ("CPU"), display, CD-ROM or DVD drive, hard-drive, mouse, keyboard, touch-sensitive screen, speakers, microphone, modem and/or router (telephone, cable or otherwise) and all of the components used for connecting these elements to one another.

As shown in FIG. 1B, the data 130 of a user device such as computer 104 may include user data 132 such as application data or other data for use in a collaborative process. Depending on the application, some or all of the user data 132 may be shared, for instance using browser 134, with a remote application or service residing on or managed by server 102 and/or the cluster 107.

The servers, user computers and other devices are capable of direct and indirect communication with one another such as over network 116. Although only a few computing devices are depicted in FIGS. 1A-B, it should be appreciated that a typical system can include a large number of connected servers and clients, with each different computer being at a different node of the network. The network 116, and intervening nodes, may comprise various configurations and protocols including the Internet, intranets, virtual private networks, wide area networks and local area networks.

Communication across the network, including any intervening nodes, may be facilitated by any device capable of transmitting data to and from other computers, such as modems (e.g., dial-up or cable), routers and the like. Although certain advantages are obtained when information is transmitted or received as noted above, other aspects of the invention are not limited to any particular manner of transmission of information. For example, in some aspects, the information may be sent via a medium such as a disk, tape, CD-ROM, or directly between two computer systems via a dial-up modem. In other aspects, the information may be transmitted in a non-electronic format and manually entered into the system.

Returning to FIG. 1A, the network 100 may also include a database 136. The database 136 may be directly or indirectly coupled to server 102. In an alternative, the database 136 may be part of or otherwise logically associated with the server 102. The database 136 may include different sets or types of data. By way of example only, the database 136 may be a map database for maintaining location and/or map-related data. Such data may be stored in one or more KFFs or other map formats. Assets and other information, including satellite data, aerial photographs, digital maps, elevation data, GPS coordinates, etc., may be obtained from one or more sources (not shown). The database 136 may alternatively maintain information concerning collaborative data, as will be explained in detail below.

FIG. 2 shows an exemplary architecture according to aspects of the invention. As shown, a server such as computer 102 may interact with cluster 107 of computers 106. Requests may originate or be otherwise received from multiple sources such as a web site or web browser 200, stand-alone applications via an API 202, and visualizations 204 that may be embedded in other web pages (e.g., charts), etc. In the case of a web browser, instructions/code may be delivered from the server 102 to a client device's browser when the client loads a given web page. Desirably, the requests are received by the server 102, for instance from user's client devices from across the network. Based upon the requests, layers for maps 206 are generated based on spatial/structured queries posed on tables maintained by the system, for instance by database 136 or by the cluster 107. A front end dispatcher module 208 converts requests into a common representation and passes them to query processing module 210, which creates a query plan. The plan is executed by a structured data backend module 212, which may communicate with a set of synchronously replicated servers 106 in cluster 107 for storage. As shown, modules 208, 210 and 212 may be part of server 102. In one alternative, the web browser 200 may also be part of the server 102, while API 202, visualizations or charts 204 and maps 206 may be external to the server 102. In other alternatives, some or all of these components may be part of the server 102, or they may all be external to the server 102.

An important challenge for the storage layer is the ability to handle a large amount of data, for instance hundreds of thousands of tables, with diverse schemas, sizes, and query load characteristics. To meet this challenge, a distributed storage system for structured data is employed. Desirably, a distributed architecture such as Google's Bigtable is used. Details of the Bigtable storage system may be found in the article by Chang et. al., "Bigtable: A Structured Storage System for Structured Data," OSDI at pp. 205-218, 2006, the entire disclosure of which is incorporated by reference herein.

In the Bigtable architecture, tulples are stored according to the form (key, value). These pairs are sorted on key, and sharded among multiple servers. Sharding is based on key ranges. A write operation is provided which adds a new tuple atomically. Three read operations are provided. They are "lookup by key," which retrieves a single pair with the given key, "lookup by key prefix," which retrieves all pairs with the given key prefix, and "lookup by key range," which retrieves all rows between a start and end key. A history is maintained for each tuple. For instance, internally a tuple is stored as (key, value, timestamp) where the timestamp represents a time at which the tuple was written. A single key can have multiple entries, one for each version of the tuple. Desirably, all rows in all user tables are stored in a single composite table, such as "Rows" as shown in Table 2 below.

TABLE 1

Rows Table

| Row Key<br>(Table ID, Row ID) | Indexed Properties | Non-Indexed Properties |
|---|---|---|
| (123, 1) | model = 328i,<br>color = red,<br>type = sedan | notes = sells<br>quickly |
| (123, 2) | model = 330i,<br>color = red, | |
| (124, 1) | price = 20,<br>location = warehouse,<br>UPC = 500 | |
| (124, 2) | price = 32,<br>location = shelf<br>UPC = 430 | notes = reorder<br>needed |
| ... | ... | ... |

Each entry in this table represents a row in a user table. The key is the concatenation of an identifier for the user's table and row. Table and row identifiers are desirably generated internally, as users may not be required to provide a primary key. The value of the row is a set of indexed and non-indexed properties. A property is a pair of the form (property name, property value). Each property name is stored repeatedly in the row. This allows for multiple rows in a single table to have a different set of properties. In one aspect, all indexed properties will be added to an index for efficient query processing.

An exemplary subset of the Rows table, namely a "Schema Table" is shown in the table below.

TABLE 2

Schema Table

| Table | Schema | Permissions |
|-------|--------|-------------|
| 123 | name: car, columns: (model, string) (color, string) (type, string) (notes, string) | viewers: (Bob, Jane) collaborators: (Jim, Alex) |
| 124 | name: product, columns: (price, number) (location, string) (upc, number) | public |

The example shown in Table 2 contains rows for two tables: 123 and 124. The first row, in table 123, contains properties for model, color, type, and notes. The second row, also in table 123, contains the same properties except for type and notes. It has been observed that this type of schema flexibility is important in supporting real user data which does not strictly adhere to a fixed schema. The schema of each user table is desirably stored in a single Bigtable-type table. In one embodiment, a single row is stored per table. Here, the key is the table identifier. The value contains column and permission information. For each column its name and preferred data type is stored. The type may be used as a helpful hint to determine natural sort order, and available visualizations, but this is not required. In another aspect, one or more access control lists (ACLs) are used for permissions. For each table the set of users is listed that are viewers (read permission), and collaborators (read/write permissions). Desirably, public tables have a special marker indicating that the table is viewable by anyone. Table 3 presents an exemplary schema for the data rows shown in Table 2.

TABLE 3

Property Index

| Table | Property Name | Property Value | Row ID |
|-------|---------------|----------------|--------|
| 123 | color | red | 1 |
| 123 | color | red | 2 |
| 123 | model | 328i | 1 |
| 123 | model | 330i | 2 |
| 124 | location | warehouse | 1 |
| 124 | location | shelf | 2 |
| 124 | price | 20 | 2 |
| 124 | price | 32 | 1 |
| ... | ... | ... | ... |

One important aspect is that the systems and methods according to the invention allow multiple users to merge their tables into one, even if they do not belong to the same organization or were not aware of each other when they created the tables. A table constructed by merging ("equi-join") multiple base tables is a "view". Desirably, views are not materialized, and only their definition and permission information is stored. According to one aspect, views have their own permissions with the same roles as a table, and with an additional role, contributor. A contributor is a user that can modify the definition of the view.

To enable collaboration, users are allowed to comment on rows, columns, cells, or tables. All the comments for all the tables are desirably stored in a single table. The key of the comments table is the topic of the comment, which is the triplet (table, row, column), and it identifies the element being commented on. The value of the row is the text of the comment, the author, and the date it was posted.

In one embodiment, a very restrictive subset of SQL is accepted, for instance the SQL subset that can be efficiently implement with the Bigtable architecture. More complex queries that do not employ SQL may be implemented by each application through the API. According to one aspect, the general query execution strategy maps a high level query into three basic operations: key lookup, prefix scan, and range scan. Here, query processing may use a property index that speeds up a wide range of queries. For instance, the index may be a Bigtable table that contains only row keys and no data. In this case, the key of each row is the concatenation of table ID, property name, property value, and row ID.

Table 4 presents a fragment of a transaction log.

TABLE 4

Table Level Log

| Table | Timestamp | Unapplied | Mutation List |
|-------|-----------|-----------|---------------|
| 123 | 3:00 | 1 | (1, k1, v1) (1, k3, v3) |
| 124 | 3:05 | — | (4, k4, v4) (4, k1, v2) |
| ... | ... | ... | ... |

A few common query plans will now be described. "Prefix scan" is used for queries such as "select * from 123 limit 100". This is a common type of query, as it corresponds to the default view on a table. Using the example above, one strategy is to do a prefix scan on the Rows table with prefix=123. Another query is "Index prefix scan", which is used for queries such as "select * from 123 where color=red". Here, a strategy is to perform a prefix scan on the index with prefix= (color, red) to find the relevant rows, and then retrieve the rows from the Rows table. In case of multiple conditions one can perform a separate index scan for each condition, and then intersect or union the set of row IDs as appropriate. "Index range scan" is used for queries such as "select * from 124 where price>10 and price<20". The strategy here is to perform a range scan on the property index the start key is (124, price, 10) the end key is (124, price, 20), and then retrieve the relevant rows from the Rows table.

And "Index Join" is used for queries such as "select * from A, B where A.key=B.key". This is the typical view resulting from merging multiple base tables. There are two basic strategies to answer this type of query. If one of the tables is small, each of its keys is looked up in the second table. Otherwise, index merge join is performed. Here, a simultaneous index prefix scan is performed with prefixes (A, A.key) (B, B.key), and the pairs of rows that match are computed. The pairs are then retrieved from the Rows table. Aspects of the invention provide transaction support for operations on a single table. In one embodiment, this is based on the Google's Megastore layer of its storage stack. Transactions are atomic, consistent, isolated, and durable (ACID). Desirably, an implementation employs write-ahead logging and optimistic concurrency control.

In the embodiment employing Megastore, a Bigtable configuration is desirably used to record the write-ahead log for each table. In this case, a single row may be used per table. The key is the table ID. The value contains the following information: last committed timestamp, list of unapplied jobs, and list of mutations. Each mutation is a tuple of the form (job id, row key, row value). Here, job id is the id of the transaction. And the pair row key/value is the data row after the mutation.

Table 4 above shown above presents an exemplary log. In this table, the first entry (row) contains the log for table 123, the last committed transaction happened at 3:00, and there are two unapplied mutations, namely (1, k1, v1) and (1, k3, v3). The second entry (row) contains the log for table 124, the last committed transaction occurred at 3:05, and there are two applied mutations, namely (4, k4, v4) and (4, k1, v2).

In one scenario, a transaction goes through the following stages. First, initialization. Here, the log record for the table is read. It is checked whether there are any unapplied transactions; if so, they are applied. And the last committed timestamp is read. Next is the word stage. Here, records for the table are read and written. All reads may be isolated. In one example, Bigtable versions are used to make sure that the transaction only reads data as it was when the transaction started. A list of all mutations is desirably maintained. The next stage is the commit stage. Here, the log record for the table is read and locked. It is checked whether another transaction has committed since the process started. If so, the process fails. If not, log entries for are written for each mutation and the job is marked as committed. The apply stage occurs next. Here, the mutations are analyzed and applied, and the job is marked as applied.

During the initialization phase the table metadata is read. At the commit stage, the log entries are written as well as the last committed timestamp. After the job is applied, the log is read and written once. This results in a total cost of 2 reads and 2 writes. Desirably, to reduce latency, when the job is applied all writes are sent to a Bigtable in parallel.

One of the most powerful aspects of the invention is that a user may visualize his/her data immediately after uploading a table. The set of available visualizations is computed based on the data types found in the table and the required types for the visualization. For example, a scatter plot may be available only if there are at least two numeric columns, one for the x axis and one for the y axis. Similarly, a map may be available if d a location column, e.g., a column with street addresses, or a column with latitude and longitude values, is detected.

Client side visualizations may be provided through an API such as Google's Visualization API. This is a well-established framework to visualize data on a user device. For instance, the visualization may be rendered on the browser using Javascript or Flash, and the data required by the visualization is obtained from a data source interface.

Different services may be provided within a framework according to aspects of the invention. In one scenario, tables and views may be exposed as a source of data for visualizations. Queries for data may be accepted and return an appropriately encoded result suitable to be used on any visualization.

Users may also be aided to configure visualizations automatically based on the data types on their tables. For example, a table with a location column and a numeric column, may have an intensity map preconfigured to use the location column as the geographic information and the numeric column as the intensity. To foster collaboration, visualizations may be enabled to be published in web pages. In that way, the data appears in the natural place where other content exists. A user may copy a small fragment of Javascript or other code into the source of a particular web page (e.g., a blog entry of the user), and the visualization will be displayed with a live link to the data. That is, anytime that the data is updated using the system, the visualization will be updated.

Table 5 below shows an exemplary fragment of Javascript code used to embed a visualization in a webpage. Line 4 defines the query that will be sent to the server or application, in this case the listing of total salary by department. Line 13 takes the received data and renders it as a pie chart. For users that do not want to write Javascript code, a fragment of code (gadget) may be directly embedded in a webpage.

TABLE 5

Embedded Visualization Code

```
 1: function getData( ) {
 2:     // Construct and send the query
 3:     var url = 'http: // tables.samplelabs.com';
 4:     var sql = 'select dept, sum(salary) from 123';
 5:         + 'group by dept';
 6:     var query=new sample.visualization.Query(url);
 7:     query.setQuery(sql);
 8:     query.send(handleQueryResponse);
 9: }
10: function handleQueryResponse(respone) {
11:     // Draw the visualization
12:     var data=response.getDataTable( );
13:     var chart=new google.visualization.PieChart(div);
14:     chart.draw(data);
15: }
```

Another aspect is the rendering of large geographic datasets. In one instance, users may upload data with street addresses, points, lines, or polygons. The data may be in different formats such as csv, xls, ods, or trix, and is desirably uploaded into tables for collaborative manipulation.

A table has a fixed schema, namely a set of columns, each with a data type. For instance, one data type for map-related applications is location. A location may include at least two components, such as a string representation (e.g., "1600 Amphitheatre Pkwy, Mountain View, Calif.") and a latitude longitude pair, (e.g., 37.423269, −122.082667). Tables with location columns may be visualized on a map. In one example, the map enables client side rendering of each row as a placemark. Such maps may be paginated, for instance with 200 rows per page.

Tables according to aspects of the invention may be rendered as map layers. The rendering is desirably done on the server side. For instance, spatial features such as points, lines, and polygons may be rendered by the server(s). Spatial and structured queries, e.g., filtering and aggregation over non-spatial features, are also supported.

Figure 3A:
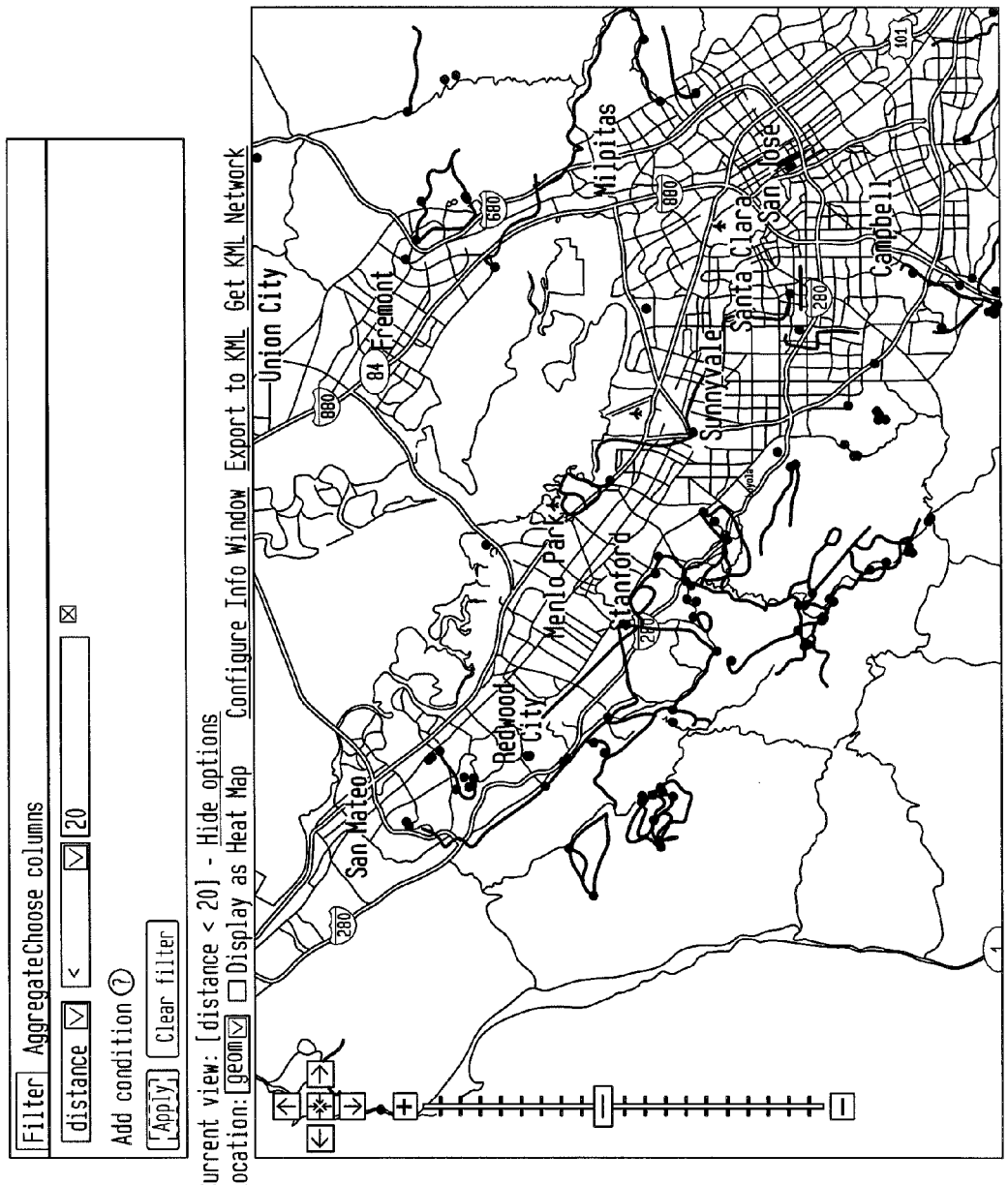
Figure 3C:
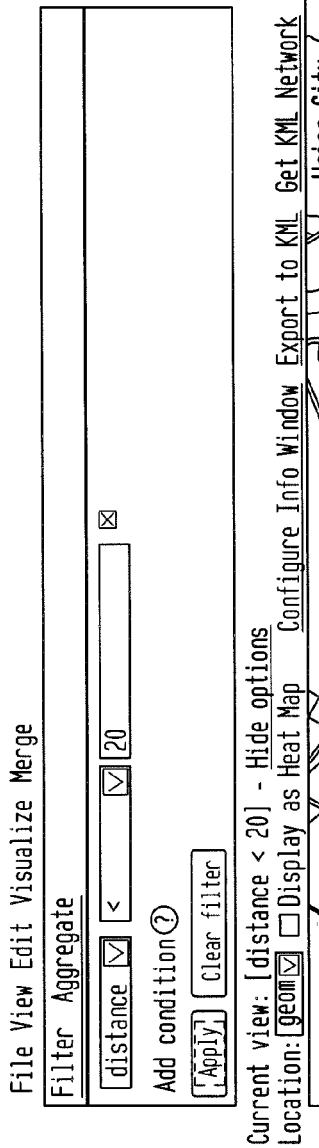

In this case of server-side map layer rendering, the client is sent a collection of small images (tiles) that contain the rendered map. By way of example only, FIG. 3A illustrates an exemplary rendering of bike trails in the San Francisco Bay area that are less than 20 miles. FIG. 3B illustrates a portion of a browser GUI in which a number of different bike trails are ranked, for instance, according to ID number. As shown, the information presented to the user may also include a rating, name and trip link, as well as other information associated with the geographical information such as descent, ascent and minimum elevation. This information may be used to filter the shared data. Other filtering options include filtering by trail ID, user ID, maximum elevation, picture link, geometry and distance. Thus, as shown in FIG. 3A, the user may select trails with a distance of less than 20 miles. And as shown in FIG. 3C, the user may choose to display the results as a heat map.

As noted above, aspects enable different users to collaborate with a common set of shared data such as information about biking trails. Assume that a group of mountain bikers is working together on compiling a list of biking trails around the world. They would be able to create a table of the form "trails" that may include information such as trail name, description, length, terrain type, technical difficulty, aerobic difficulty, and line, where line is the polyline defining the trail. Non-spatial attributes may also be part of the collaborative table.

In one example, a user may want to search for biking trails with technical difficulty <3, length>10 (e.g., miles) and terrain type="forest" around San Francisco. The user may employ his/her browser to access a web page, open the trails table from the web page, view it on a map, center/zoom the map around San Francisco, and enter the above query. The system display all trails that fall in the given view port (around San Francisco), and that match all the given predicates. Of course, while this example pertains to bike trails, it should be understood that the mapping and filtering options is not limited thereto and may apply to other kinds of data.

In order to render a client side visualization via the browser or other application, all of the data is sent to the client. The client device's browser then renders the visualization. However, this type of model may be difficult to apply when a large dataset needs to be visualized at once. Two main difficulties exist. First, the browser may not have enough power to draw thousands of features in real time. Second, the transmission of a large dataset to the client device may be impractical.

The information that a user sees on a mapping application such as Google Maps is comprised of an overlay of multiple layers. For example, street, satellite, and terrain maps are separate layers. Any query result that is to be displayed on a map is represented as a layer. When a user submits a request to view a map, a corresponding request is sent to the backend servers identifying the currently visible layers, the geographic coordinates of the window that is visible on the client device's browser, and the current zoom level. The backend (e.g., server 102 or cluster 107) then creates tiles (images) by putting together information in the different layers, and it serves the tiles as a response to the original request.

According to one aspect, geographical features are inserted into a spatial index. The spatial index supports queries of the form "get all features contained in the given s2cell". An "s2cell" is used when projecting portions of the Earth onto a cube. Here, a recursive Hilbert curve is placed over each face of the cube. An s2cell is represented by a cell ID ("S2CellID"). The S2CellID may be, e.g., a 64-bit identifier where the first 3 bits define what face on the cube the cell belongs to, the next several bits identify how far recursively to go into the Hilbert curve, and the remaining bits describe the cells to be followed when going into the Hilbert curve. A separate index may be created for the features contained in each location column of a table. The index is a sorted list of s2 cell IDs, such as index[S2CellID]→Features in S2CellID. An S2CellID represents a recursive subdivision of space.

The spatial index is desirably completely stored in memory (e.g., in map database 136 of FIG. 1A), and can be modified dynamically by collaborative users so that features can be added, deleted, or updated. In one example, a feature may contain information such as table ID, feature ID, and geometry. Where "table ID" is the ID of the table containing the feature, "feature ID" is a globally unique ID for the feature, and geometry is a list of points describing the point, line, or polygon.

Each row in the database desirably stores the following information: Table ID—the table where the feature appears; Column ID—the column in the table where the feature appears; Feature ID—the ID of the feature, which is unique across tables and columns; and one or more protocol buffers such as data structures to store data.

The index uses a space filling curve to map points on the Earth's surface to a one dimensional curve. The Earth is projected into the six faces of a cube. Each face is recursively divided into cells. Cells are mapped from 2-D into a 1-D using space filling curve, and each cell is assigned an identifier which is its position in the curve.

The level of a cell corresponds to the number of times that the subdivision has been applied. Each subdivision breaks the cell into 4 quadrants. In one example, the maximum level is 30, which roughly corresponds to one square centimeter. Cell IDs are sorted in Hilbert order.

The following identifies several operations that may be supported by the index. One operation is "insert point p". Here, a cell equals an S2CellID of the point p (lowest level cell). This operation adds the point to index[cell]. Next is "insert line/polygon". Here, the process simplifies the line, through sampling, to a maximum of 100 points, although other maximums may be employed. Next, the set of cells that cover the simplified line is computed, where the cells can be at any level. For each cell in the cover, a line to index[cell] is added. Another operation is "query for features in cell q". Here, the process computes the start and end cells (at the lowest level) for cell q. All features in the range index[start-end] (between the start and end cells) are then retrieved. Desirably all features in cells that are an ancestor of q are obtained. In one example, a maximum number of ancestor lookups is set to 30. Here, there is a hierarchy of cells, and a cell at the bottom of the hierarchy can have a maximum of 30 ancestors. The cost of retrieving the ancestors may thus be capped at 30 lookups. From this, the union between the features in the range index and the features in cells that are an ancestor of q is obtained.

Figure 4:
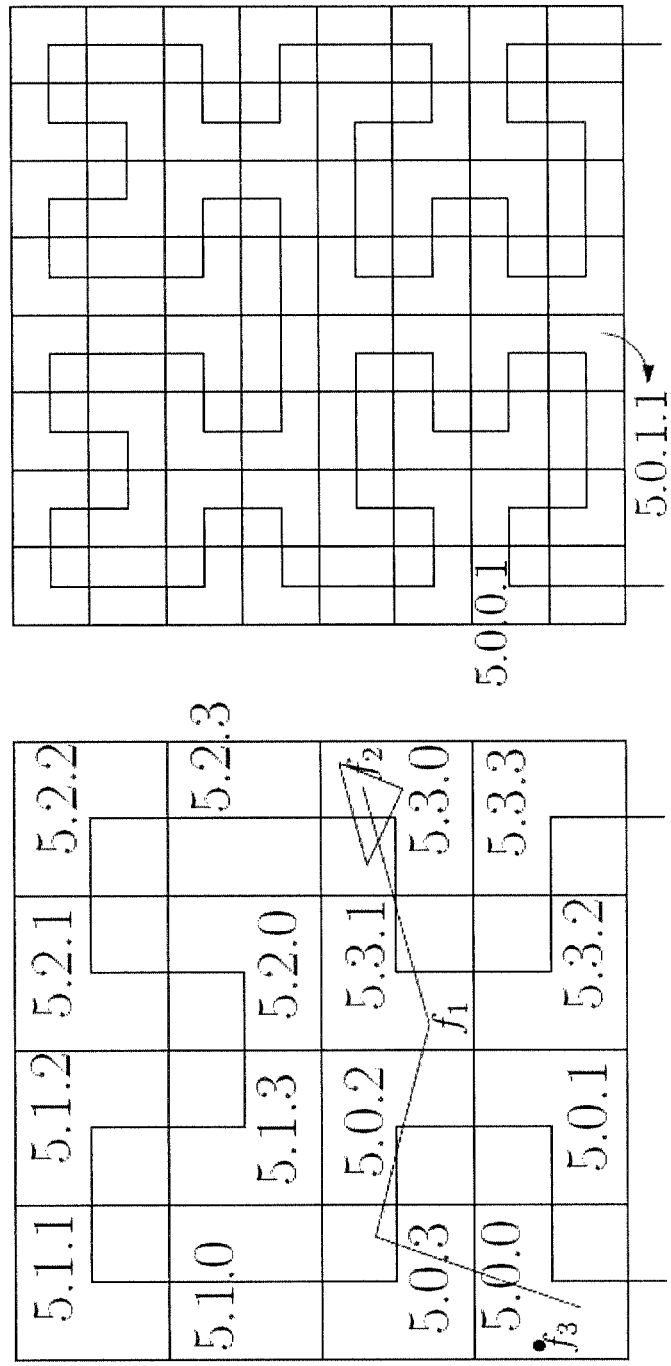
FIG. 4 illustrates an example of a Hilbert curve in accordance with aspects of the invention.

The recursive definition of cells is as follows. At the top level, each face of the cube is in a single cell, and at every subsequent level a cell is divided into four smaller cells. The number of levels is determined by the desired granularity. FIG. 4 shows an example of a two level Hilbert curve. The index is a sorted list of cell identifiers. Each cell identifier points to all the features that overlap that cell. Table 6 presents and exemplary spatial index with three features. In this table, $f_1$ is a polyline, $f_2$ is a small polygon, and $f_3$ is a point.

TABLE 6

| Spatial Index | |
| --- | --- |
| Cell | Features |
| 5.0.0 | $f_1, f_2$ |
| 5.0.0.1 | $f_3$ |
| 5.0.2 | $f_1$ |
| 5.0.3 | $f_1$ |
| 5.3.0 | $f_1, f_2$ |
| 5.3.1 | $f_1$ |

A feature desirably contains the following information: an ID which is a feature ID (unique across tables and columns), a table ID representing the table that contains the feature, a column ID which identifies the column that contains the feature, a minimum level of detail (LOD) at which the feature should be visible, and a geometry which may be an S2Point, S2Polyline, or S2Polygon. The memory footprint of a feature may be on the order of: 24+(24*number_of_points). Thus, a machine with 8 GB of RAM may hold around 450,000 100-point lines/polygons, or around 20 million single point features.

Features may be reinserted into the index as follows. The feature is mapped into the set of cells that cover it. The cover of a feature may involve cells at multiple levels, e.g., a polygon that covers a large portion of a state will have large cells in the middle, and only finer cells in the boundaries. The cells that make up the cover are inserted or updated in the index to point to the feature.

Spatial query processing may be performed as follows. A common query for the spatial index may be "what features fall into a bounding box?" The bounding box is defined by a pair of latitude, longitude coordinates. The strategy to answer the query is as follows. First, convert the bounding box into a range (or ranges) in the space filling curve. Then, for each such range, retrieve all the features that are contained in cells between the start and end of the range.

Spatial and structured queries are supported over maps. For example, a user may ask for all bike trails that fall in the San Francisco Bay area (a spatial query) and that have a rating of 4 stars or more (a structured query). These queries may be answered by executing the spatial and structured queries in parallel, and then intersecting the results.

An example of this process is illustrated below. A query may contain a collection of predicates and an aggregation specification. Responses to queries return the set of feature IDs satisfying the predicates. For instance, the process of receiving and answering a given request is as follows: First, a request of the form (s2cell, sql) is received from a client application (e.g., browser). Next, the features inside s2cell are looked up in the spatial index. Then the set of features matching the sql query is looked up in the structured data store. The intersection of results between the features inside the s2cell and the features from the structured data store is obtained and provided to the user.

In the interest of ensuring fast map visualizations, a limit may be placed on the number of features that can be drawn on any tile. If the number of features for a tile that satisfy a user query exceeds this limit, the server(s) may return only a sample of the items in its response to the mapping server(s).

In one example, the number of features returned for any tile may be limited to a maximum of 500. At index load time a thinning algorithm/process is performed that determines the minimum level of detail at which each feature will become visible. This process guarantees that no tile will contain more than 500 features. Table 7 illustrates an exemplary process for a tile-based thinning procedure for a spatial index.

TABLE 7

Tile-Based Spatial Index Thinning Procedure

```
1: // Compute the mapping of features to tiles
2: for each feature (f) in the index
3:     for each tile (t) in which the feature can be rendered
4:         t.features += f
5: // Thin each tile, in increasing level of detail (lod)
6: for each level of detail (lod) in increasing order
7:     for each tile at level lod with features
8:         free = list of features in the tile that have
                    lod > t.lod
9:         taken = list of features in the tile that have
                    lod <= t.lod
10:        s = sample up to 500 − |taken| features from free
11:        for each feature f in s, s.lod = t.lod
```

As shown in the table, first the features are mapped to respective tiles. This is done for each feature in the index. In line 4, the set of features in a given tile is updated to include each feature that can be rendered in that tile. Then, for each tile at a given level of detail (starting with the lowest level of detail), different parameters are determined. For instance, in line 8, a list of features ("free") in the tile is set where the level of detail is greater than the level of detail for the tile. And in line 9, another list of features ("taken") is set where the level of detail is less than or equal to the level of detail for the tile. For the total number of samples ("s") up to the maximum (e.g., 500), the system can sample the maximum minus the number of features that are already committed to be displayed on the tile. And in line 11, for each feature f in the set s, the level of detail at which the feature should start appearing is adjusted to that of the tile.

Sampling should be consistent. The set of features returned for a given level of detail should not change between requests. The reason is that two different servers (for instance in cluster 107) may be asked to compute adjacent tiles. If the set of visible tiles is not consistent, it is possible for features in the border of the tiles to be shown only in one of them. Therefore, samples are desirably chosen such that points never disappear when a user moves the view port or zooms into it. Sampling may be performed as follows. Each feature is evaluated and all the tiles where it appears (at every zoom level) are computed. The feature is assigned to each such tile.

When the total number of results for a structured query is small for the given lod, thinning may be disabled. Feature-based thinning may also be employed. Here, when lines and polygons are rendered, the number of points used to display the feature is dependent on the level of detail. For low levels of details, e.g., representing far away items of interest, a small number of points may be used. For high levels of detail, e.g., representing close items of interest, more points may be used. In one example, the polygon may be sampled uniformly to determine the points to use. An alternative is to adjust the rate of sampling to the angle changes between edges.

The hierarchy of tiles is traversed, from low zoom (far away) to high zoom (close by). At each level a sample of features is assigned to the tile. As lower zoom levels are evaluated, new features are added to the features already assigned to the tile through parent tiles. This process guarantees that a tile will not have more than a predefined threshold of features, and it insures that the sampling is consistent. At the end of the process each feature contains just one additional attribute, the minimum zoom level at which the feature appears.

As illustrated in FIG. 3C, the system also supports the rendering of heat maps. This is useful when the user wants to see a map colored according to the density of features in space. It can also be used to visualize very large datasets were sampling may not capture subtle differences in feature density from tile to tile.

According to one aspect, heat maps may be built as follows. The set of features that fall into the viewport using the spatial index are retrieved. The viewport into a fine grid is retrieved, and the number of features in each grid cell is counted. Grid cells may be colored according to the number of features that intersect them, for instance, with a palette that assigns light colors to low count cells and strong colors to high count cells. Cells with no features are not colored. The user can generate a heat map that contains only the subset of features that match a given structured query.

As with client visualizations, maps can be published in web pages. A user can copy a small fragment of Javascript code into the source of their page and the map will be displayed with a live link to the data. Table 8 shows an exemplary fragment of Javascript code used to embed a map in a web page.

TABLE 8

Embedded Map Code

```
1: // Create a new layer for the "Fusion Tables" map
2: var 1 = new GLayer ("ft : 602");
3: // Draw the map as features (not as heat)
4: 1.setParameter("h", "false");
5: // Display only features that match the query
6: var sql = "select col2 from 602 where length < 20";
7: 1.setParameter ("s", sql);
```

Line 2 creates the layer, named ft:tableId. Desirably, each table has its own layer. Multiple tables may be added to the same map by just adding their respective layers. Line 4 instructs the application to draw the layer as features, and not a heat map. Line 7 sets an SQL query that filters the set of relevant features.

An important component of a platform for data management and collaboration is to provide developers with a way to extend the functionality of the site. This is accomplished through an API. The API allows external developers to write applications that use the system as a database. For example, an application may synchronize a collection of bike routes with a table. The API supports querying of data through select statements. Update of the data is performed through insert, delete, and update statements. And data definitions may be performed through a "create table" statement. All access to data through the API may be authenticated through existing standards. One example of this is the OAuth protocol.

In one example, each request associated with a collaborative application contains a parameter with a SQL query. Here, only features satisfying the query should be returned. In one alternative, the system may make around 12-20 requests per view port. Each of these requests contains the same sql query. In order not to overwhelm the structured data store, query results are cached. The caching strategy maintains a table with key=table ID, sql, and contents=feature ID list. When a request arrives, the cache is first examined. If the answer is there it is returned. If it is not, the structured data store is asked for the answer, which is then added to the cache. Whenever the table is modified, all of its cache entries are invalidated.

Access control information for an access control list may also be cached. In this alternative, requests from users may provide the user ID of the current user. Here, the system verifies that the user has read access to the table. This check requires reading table metadata from the database. Access control lists may be maintained on the table to determine if the user has access. In order to reduce latency, an in-memory cache (LRU) is kept with authentication information for each table. For non-public tables, a list of pairs of the form (user ID, authorized) is maintained, where "authorized" can be true or false. For public tables a special marker may indicate that anyone can read them.

The back office application server or cluster servers may respond to the following two queries. One is a request for layers that returns features visible in a tile (s2 cells), and which matches a sql query. As discussed above, the query is answered by intersecting the set of features that match the spatial query, and the set of features that match the sql query. The total number of results is may be limited or thinned to a predetermined number (e.g., 100, 500 or 1,000). Another request asks for feature content. The response to this request may return a link for the window of a given feature. The structure data store may always be queried to retrieve the details of the feature.

The servers may also respond to refresh calls. For instance, there may be a request to reload all features for the table, and recreate the spatial index. There may also be a request to add all or delete all features. In the latter case, features may not actually be deleted from the index, but just marked as deleted and not returned on queries. This is because deleting a feature can be expensive, as it needs to be removed from every entry where it appears in the index. Another request to the back office server(s) may be to eliminate the cache of authorization information for a given table. The cache may be invalidated in response to permissions updates.

All data modification may be done through a single server, such as server 102 of FIG. 1A. The back office servers such as computers 106 in cluster 107 may only have read-only access to the data store. For instance, there are two cases in which the store is read (1) when the server starts it reads all features and builds the spatial index, and (2) when the back office server receives a request from the server with modification responsibility to reload a given table. The server configured to perform modifications is responsible to write new features to the spatial store. Features may be added for the following cases: (1) when a new file is imported and it contains geographical features, and (2) an existing file is modified and it contains geographical features. In both of these cases the back office server is notified, and asked to perform the necessary updates to its index.

The back office servers, such as those of cluster 107 of FIG. 1A, may be sharded and replicated. For instance, each shard may be responsible for a subset of layers (tables). The back office severs may be implemented using two datacenters. In one alternative, a first server embodies a first shard and a second server embodies a second shard. Here, traffic is directed to specific servers in each datacenter from global servers. The global servers desirably route traffic to the datacenter closest to the end user's location. This may be done based upon the IP address of the user accessing the map through a browser.

The number of shards can be increased to handle more tables. A range-based sharding function may be used that creates N shards, each handling a range of table IDs. For example, if there are 5 shards, the setup may be organized according to layers, for instance: shard 0 '^ft:.*[0-1]' shard 1 '^ft:.*[2-3]' shard 2 '^ft:.*[4-5]' shard 3 '^ft:.*[6-7]' shard 4 '^ft:.*[8-9]'. Here, layer identifiers start with "ft" and are followed by a table identifier. Desirably each shard can handle on the order of 20 million points or more.

The above architectures and alternatives provide a robust environment for collaboration. Users may upload and access data sets from remote locations, sharing the data and collaborating in real time. Different file types (e.g., CSV or KML files) or structures (e.g., spreadsheet formats) are permitted. Each user may upload large file sizes on the order of 100 MB, 250 MB or more.

The data is desirably processed in real time on the server side, enabling users to view the data on a map or chart once it is uploaded. Columns of data with location information may be interpreted automatically, and a user can adjust it directly on a map if desired. Filters and aggregate tools may be used to generate more selective visualizations. For instance, tables of data pertaining to bike trails may be filtered based upon the length and/or location of the trails.

As part of the collaborative process, other users may be given access to view data, contribute data or edit data. In one example, the e-mail addresses of users to whom access will be granted are entered into the system. Access may be granted to all of the data or to a subset such as certain columns (e.g., trail rating, name of the trail, ascent or descent information, etc.). A linked table may have its own share permissions that show the creator's current data values.

In another example, when two or more tables of data have information regarding the same entities or items, the tables may be merged together to see all the information in one place. In this case, when any data table is updated, the merged table will shows the latest updated information. In these scenarios, multiple users can view and comment on the data. Discussion threads can display the users' comments and any changes to the data over time.

When data is imported or otherwise uploaded to the system, the user uploading the data may specify attribution for the data. In one example, the attribution will appear even when the data is merged into other tables. Furthermore, any maps or charts of the data may be embedded into a web page or blog post. The embedded map or chart is desirably configured so that it always displays the latest data values for the information.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims. In addition, unless otherwise expressly stated herein, different processes according to aspects of the invention may be performed in a different order or concurrently.

The invention claimed is:

1. A method comprising:
generating, with one or more processors, a composite table from geospatial data sets associated with respective users of the geospatial data sets, each geospatial data set having a permission and at least some of the geospatial data sets having different permissions, each entry of the composite table representing information of a given one of the geospatial data sets; and
generating, with the one or more processors, one or more visualizations of selected data in the composite table for presentation on one or more selected user devices, each visualizations being determined based on corresponding data types found in the composite table and the permissions associated with any corresponding geospatial data sets.

2. The method of claim 1, wherein authorized users are allowed to comment on rows, columns or cells in the composite table based on the permissions associated with the corresponding geospatial data sets.

3. The method of claim 1, wherein access is granted to some or all of the selected data in the composite table using address information for authorized users.

4. A method comprising: generating, with one or more processors, a composite table from geospatial data sets associated with respective users of the geospatial data sets, the composite table including one or more rows from each geospatial data set, each geospatial data set having a permission and at least some of the geospatial data sets having different permissions, and each entry of the composite table representing information of a given one of the geospatial data sets; generating, with the one or more processors, a visualization of selected data in the composite table for presentation to one or more users, the visualization being determined based on corresponding data types found in the composite table and the permissions associated with any corresponding geospatial data sets; and providing data usable to render the visualization as one or more map layers.

5. The method of claim 4, further comprising:
receiving a request to view a given one of the one or more map layers; and
creating a tile in response to the request, the tile including one or more features responsive to the request.

6. The method of claim 5, wherein the one or more features are associated with a spatial index, and the spatial index is configured for dynamic modification by collaborative users so that selected features can be added, deleted, or updated to the spatial index.

7. The method of claim 6, wherein at least some of the features associated with the spatial index have permission information, and the spatial index is further configured so that the selected features can be added, deleted, or updated in accordance with the permission information.

8. The method of claim 4, wherein authorized users are allowed to comment on rows, columns or cells of all tables in the composite table in accordance with permission information.

9. A method comprising: generating, with one or more processors, a composite table from a group of geospatial data sets, each geospatial data set being associated with a respective user, each geospatial data set having a permission and at least some of the geospatial data sets having different permissions, the composite table including one or more rows from each geospatial data set and each entry of the composite table representing information of a given one of the geospatial data sets; and generating, with the one or more processors, a visualization of selected data in the composite table for presentation to one or more users, the visualization being determined based on corresponding data types found in the composite table and the permissions associated with any corresponding geospatial data sets.

10. The method of claim 9, wherein authorized users are allowed to comment on rows, columns or cells in the composite table in accordance with permission information.

11. The method of claim 10, wherein all comments on data in the composite table are stored in a single table having a key identifying an element being commented on by table, row and column.

12. The method of claim 9, wherein the visualization is rendered as one or more map layers.

13. A method, comprising: executing, with one or more processors, a spatial query on a composite table to obtain a spatial query result, the composite table being derived from a group of geospatial data sets, each geospatial data set being associated with a respective user, each geospatial data set having a permission and at least some of the geospatial data sets having different permissions, each entry of the composite table representing information of a given one of the geospatial data sets; executing, with the one or more processors, a structured query on the composite table in accordance with the permissions of the geospatial data sets to obtain a structured query result; and intersecting the spatial and structured query results to obtain a query response including the intersected results.

14. The method of claim 13, wherein the spatial and structured queries are executed in parallel.

15. The method of claim 13, wherein a received query contains a collection of predicates and an aggregation specification.

16. The method of claim 15, wherein the query response includes a set of feature IDs satisfying the collection of predicates.

17. The method of claim 13, wherein the spatial query is associated with a bounding box having a pair of boundary coordinates.

18. The method of claim 17, wherein executing the spatial query includes converting one or more ranges in a space filling curve and, for each range, retrieving all features that are contained in cells between a start and an end of the range.

* * * * *